(12) United States Patent
Welschholz

(10) Patent No.: US 9,145,063 B2
(45) Date of Patent: Sep. 29, 2015

(54) CHARGING SYSTEM FOR VEHICLES WHERE THE CHARGING COILS ARE COUPLED THROUGH THE VEHICLE LICENSE PLATE

(75) Inventor: Joerg Welschholz, Herscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 708 days.

(21) Appl. No.: 13/554,004

(22) Filed: Jul. 20, 2012

(65) Prior Publication Data

US 2012/0280652 A1 Nov. 8, 2012

Related U.S. Application Data

(63) Continuation of application No. PCT/EP2011/053650, filed on Mar. 10, 2011.

(30) Foreign Application Priority Data

Mar. 12, 2010 (DE) .......................... 10 2010 011 235
Jun. 4, 2010 (DE) .......................... 10 2010 022 740

(51) Int. Cl.
*H02J 7/00* (2006.01)
*H02J 17/00* (2006.01)
*B60R 13/10* (2006.01)
(Continued)

(52) U.S. Cl.
CPC ........... *B60L 11/182* (2013.01); *B60L 11/1831* (2013.01); *B60L 11/1835* (2013.01); *B60R 13/10* (2013.01); *H02J 7/025* (2013.01); *Y02T 10/7005* (2013.01); *Y02T 90/12* (2013.01);
(Continued)

(58) Field of Classification Search
CPC ............. B60L 11/182; B60L 11/1831; B60L 11/1835; B60L 11/18; B60R 13/10; Y02T 90/121; Y02T 90/122; Y02T 90/14; Y02T 90/125; Y02T 90/12; Y02T 10/7005; Y02T 10/7088
USPC ............................ 320/108, 109; 307/10.1, 66
See application file for complete search history.

(56) References Cited

U.S. PATENT DOCUMENTS 4,496,896 A * 1/1985 Melocik et al. ............... 320/108
4,782,342 A * 11/1988 Walton .......................... 340/941
(Continued)

FOREIGN PATENT DOCUMENTS

CN 201276077 Y * 7/2009
DE 2434890 B1 * 11/1975
(Continued)

OTHER PUBLICATIONS

The Ink Tub, Published Jan. 6, 2008, Accessed online Jun. 8, 2015, http://www.shedpress.com/theinktub/?p=48.*
(Continued)

*Primary Examiner* — Drew A Dunn
*Assistant Examiner* — John Trischler
(74) *Attorney, Agent, or Firm* — Brooks Kushman P.C.

(57) ABSTRACT

A system for charging an electric vehicle includes a vehicle-side transformer part arranged behind a license plate of the vehicle. The vehicle-side transformer part couples with a charging station-side transformer part through the license plate when the charging station-side transformer part is arranged in front of the license plate such that electrical energy can be transferred through the transformer parts to the vehicle.

14 Claims, 2 Drawing Sheets

(51) Int. Cl.
  *B60L 11/18* (2006.01)
  *H02J 7/02* (2006.01)

(52) U.S. Cl.
  CPC ............ *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | | |
|---|---|---|---|---|
| 4,952,937 | A * | 8/1990 | Allen | 342/20 |
| 5,341,083 | A * | 8/1994 | Klontz et al. | 320/109 |
| 5,498,948 | A * | 3/1996 | Bruni et al. | 320/108 |
| 5,539,296 | A * | 7/1996 | Ito | 320/108 |
| 5,710,502 | A * | 1/1998 | Poumey | 320/108 |
| 5,821,731 | A | 10/1998 | Kuki et al. | |
| 5,850,135 | A | 12/1998 | Kuki et al. | |
| 6,535,116 | B1 * | 3/2003 | Zhou | 340/447 |
| 2008/0042848 | A1 * | 2/2008 | Roberts et al. | 340/572.7 |
| 2010/0017249 | A1 * | 1/2010 | Fincham et al. | 705/8 |
| 2010/0201309 | A1 * | 8/2010 | Meek | 320/108 |
| 2010/0241470 | A1 * | 9/2010 | Smith | 705/7 |
| 2011/0148350 | A1 * | 6/2011 | Wegener et al. | 320/108 |
| 2014/0111155 | A1 * | 4/2014 | Bendicks | 320/108 |
| 2014/0240076 | A1 * | 8/2014 | Elias et al. | 336/221 |
| 2014/0253278 | A1 * | 9/2014 | Elias et al. | 336/221 |
| 2015/0061593 | A1 * | 3/2015 | Wechlin et al. | 320/109 |

FOREIGN PATENT DOCUMENTS

| | | |
|---|---|---|
| DE | 202009007394 U1 | 8/2009 |
| DE | 102008062107 A1 * | 6/2010 |
| DE | 102009023409 A1 | 12/2010 |
| EP | 0788211 A2 | 8/1997 |
| EP | 0823716 A2 * | 2/1998 |
| GB | 882906 A * | 11/1961 |

OTHER PUBLICATIONS

"Magna-Charge System," Marshall Brain, HowStuffWorks, Published on Wayback Machine May 17, 2008, Access Jun. 8, 2015, www.archive.org/web/20080517090855/http://auto.howstuffworks.com/electric-car6.htm.*

"Wireless electricity products spark a new industry: Magnetically Coupled Resonance," Paul Evans, Published Online Jan. 15, 2009, Access Online Jun. 8, 2015, http://www.gizmag.com/wireless-power/10714/.*

"Charging Electric Cars Effectively Inductive," Dr.-Ing Bernd Eckardt, Fraunhofer, Published Jul. 30, 2014, Accessed Jul. 30, 2015, www.fraunhofer.de/en/press/research-news/2014/august/charging-electric-cars-efficiently-inductive.html.*

The International Bureau of WIPO, International Preliminary Report on Patentability for corresponding International Application No. PCT/EP2011/053650 mailed Oct. 4, 2012.

European Patent Office, International Search Report for corresponding International Application No. PCT/EP2011/053650 mailed Apr. 19, 2012.

\* cited by examiner

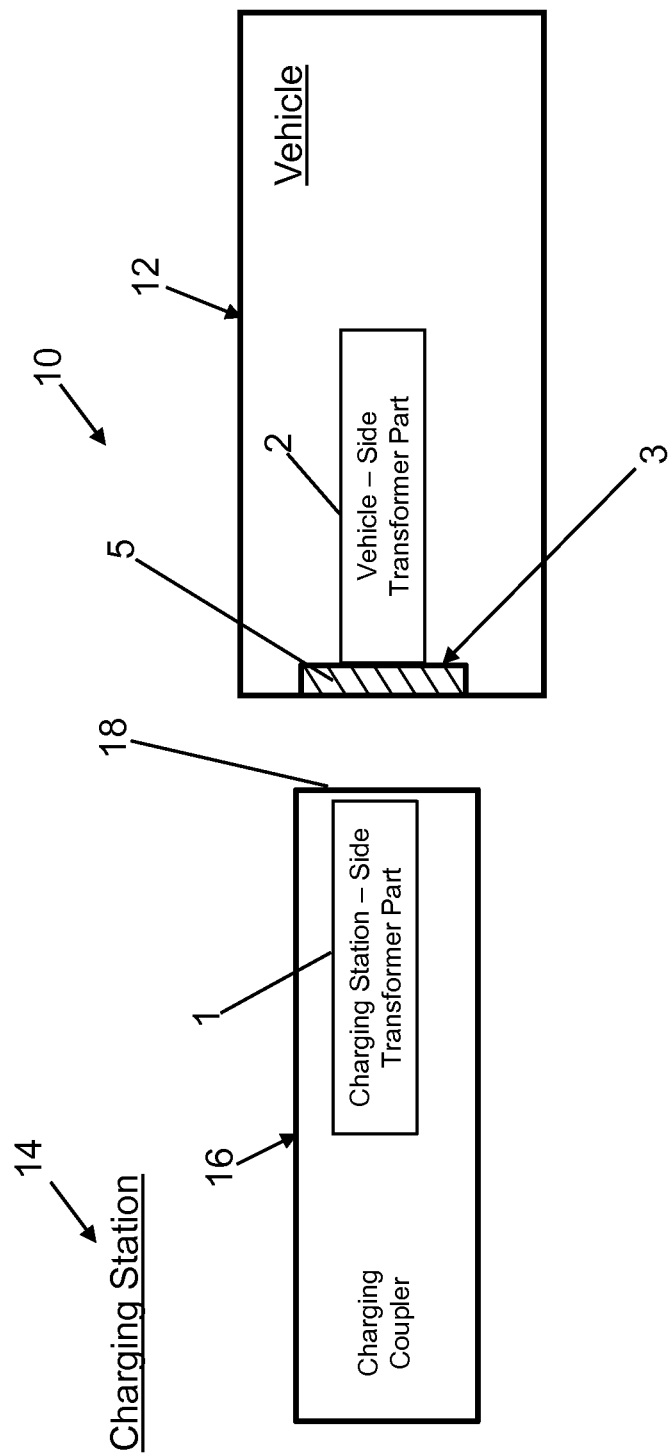

CHARGING SYSTEM FOR VEHICLES WHERE THE CHARGING COILS ARE COUPLED THROUGH THE VEHICLE LICENSE PLATE

CROSS-REFERENCE TO RELATED APPLICATIONS

This application is a continuation of International Application No. PCT/EP2011/053650, published in German, with an International filing date of Mar. 10, 2011, which claims priority to DE 10 2010 011 235.6, filed Mar. 12, 2010 and DE 10 2010 022 740.4, filed Jun. 4, 2010; the disclosures of which are incorporated in their entirety by reference herein.

TECHNICAL FIELD

The present invention relates to a transmission system for charging the traction battery of an electric vehicle parked at a charging station in which the transmission system includes first and second transformer parts with the first transformer part being associated with a charging station coupler that can be attached to the vehicle and the second transformer part being associated with the vehicle whereby electrical energy can be transferred from the charging station through the transformer parts to the traction battery of the vehicle when the coupler is attached to the vehicle.

BACKGROUND

DE 24 34 890 B1 describes such a transmission system having two transformer parts provided respectively on an electric vehicle and a parking space. Electrical energy can be transferred through an inductive path from an AC network at the parking space to the traction battery of the vehicle upon the transformer parts being coupled together. The transformer part of the vehicle is located in a front bumper of the vehicle. The transformer part of the parking space is in a horizontal charging board at the parking space. The transformer parts are mounted on springs to achieve coupling without an air gap therebetween.

DE 24 34 890 B1 assumes that the shape, dimensions, and spatial arrangement of the two transformer parts respectively on the vehicle and the parking space match one another. This is not simple to satisfy in practical environments especially when the transmission system is to be used with vehicles having various diverse designs. The transformer part on the vehicle has to be adequately oriented with respect to the assembly of the transformer part of the parking space. The coupling of the transformer part of the parking space to the transformer part in the front bumper region of the vehicle is made more difficult in modern vehicles as the bumper is usually covered by body trim, such as by the so-called front apron. Moreover, different types of vehicles have various diverse shaped vehicle bodies. This makes a precise alignment of the two transformer parts even more difficult.

SUMMARY

An object of the present invention includes a transmission system for charging the traction battery of a vehicle in which the transmission system is simple, universal, and comfortable to use.

Some embodiments of the present invention are directed to a transmission system configured to charge the traction battery of an electric vehicle at a charging station. The transmission system includes first and second transformer parts. The first transformer part is associated with a coupler of the charging station. The coupler is attachable to the vehicle when the vehicle is parked at the charging station. The second transformer part is associated with the vehicle. The transformer parts are coupled together when the coupler is attached to the vehicle. Electrical energy can be transferred from the charging station through the transformer parts to the traction battery of the vehicle when the transformer parts are coupled together.

The vehicle-side transformer part is arranged behind a license plate of the vehicle and lies physically against the inner, non-exposed side of the license plate. The coupler of the charging station attaches to the vehicle by being placed on the outer, exposed side of the license plate. As a result of the coupler being placed on the outer side of the license plate, the charging station-side transformer part lies physically against the outer side of the license plate. Hence, the transformer parts physically sandwich the license plate with the transformer parts being inductively coupled to one another through the license plate.

Some embodiments of the present invention are directed to a transformer part of a transmission system configured to charge the traction battery of an electric vehicle at a charging station. This transformer part is a vehicle-side transformer part that is associated with the vehicle. The vehicle-side transformer part is arranged behind a license plate of the vehicle physically against the inner side of the license plate. The transmission system includes a charging-side transformer part that is associated with the charging station. The charging station-side transformer part belongs to a coupler at the charging station. The coupler is attachable to the vehicle. In particular, the coupler attaches to the vehicle by being placed against the outer side of the license plate such that the charging station-side transformer part is arranged physically against the outer side of the license plate opposite to the vehicle-side transformer part. As a result, the transformer parts couple together when the coupler is attached to the vehicle. Electrical energy can be transferred from the charging station through the transformer parts to the traction battery of the vehicle when the transformer parts are coupled together.

As described, in embodiments of the present invention, the vehicle-side transformer part is arranged behind a license plate of the vehicle. This is advantageous because official license plates are generally mounted in standardized positions on vehicles. Typically, license plates are attached to the front center of the vehicle body and/or to the rear center of the vehicle body, with minimal clearances above the roadway being prescribed. In any case, the locations of the license plates are easy to locate on the vehicle body even if they deviate from the standard. For vehicles in which the vehicle-side transformer part is located behind the front or rear vehicle-side license plate, it is thus easy to locate the vehicle's attachment piece for the charging station coupler.

In embodiments of the present invention, a license plate completely, or at least to a large extent, is formed of a material that does not conduct electrically, or does so only to a small extent. As such, eddy current losses can be kept relatively small during the energy transfer process from the charging station-side transformer part to the vehicle-side transformer part. In embodiments of the present invention, the license plate is formed of an electrically non-conductive plastic material. However, the license plate may be formed of other materials or material combinations that do not conduct electrically or do so to a small extent. Electrically conductive materials having small dimensions in the direction of inductive energy transmission affect the transmission slightly. Thus, the official registration number can be placed in the form of a thin metallic coating on the otherwise electrically non-, or slightly, conducting license plate.

The coupler of the charging station is placed from the outside on the license plate of the vehicle in order for the charging station-side transformer part to inductively couple with the vehicle-side transformer part. As the two transformer parts are then separated by the relatively thin-walled license plate, the energy transmission can take place with relatively high efficiency.

In embodiments of the present invention, the coupler of the charging station has a bearing surface whose dimensions correspond to the standard size of a given license plate. This enables achievement of a precisely positioned assembly of the transformer parts to one another in a particularly simple manner.

In embodiments of the present invention, the coupler of the charging station is positioned by a control mechanism with an electric motor. Additional means for the precise determination of the position of the license plate may be used. For example, a camera monitoring the license plate position may cooperate with the control mechanism. It is thereby possible to automatically, without manual intervention, move the coupler onto the outer side of the license plate to complete the coupling of the transformer parts.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

BRIEF DESCRIPTION OF THE DRAWINGS

FIGS. 1 and 2 illustrate respective block diagrams of components of a transmission system for charging the traction battery of an electric vehicle parked at a charging station in accordance with an embodiment of the present invention.

DETAILED DESCRIPTION

Figure 1:
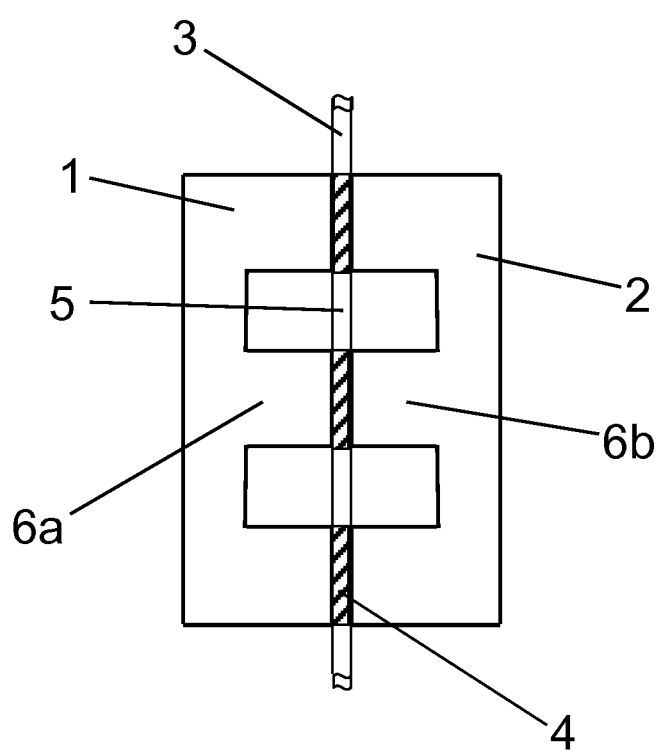

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1 and 2, respective block diagrams of components of a transmission system 10 in accordance with an embodiment of the present invention are shown. The transmission system is for charging the traction battery of an electric vehicle 12 parked at a charging station 14. The transmission system includes a first transformer part 1 and a second transformer part 2. First transformer part 1 is associated with a coupler 16 of the charging station and is thereby a charging station-side transformer part 1. Second transformer part 2 is associated with the vehicle and is thereby a vehicle-side transformer part 2.

The coupler of the charging station can be attached to the vehicle when the vehicle is parked at the charging station. The coupler has a bearing surface 18 whose dimensions may correspond to the standard size of a license plate. Transformer parts 1, 2 are physically adjacent to one another and inductively couple together when the coupler is attached to the vehicle. Electrical energy can be transferred from the charging station through transformer parts 1, 2 to the traction battery of the vehicle when the coupler is attached to the vehicle with transformer parts 1, 2 being inductively coupled together.

As described in greater detail below, vehicle-side transformer part 2 is arranged behind a license plate 3 of the vehicle and lies physically against the inner (typically non-exposed) side of license plate 3. Accordingly, as shown in FIG. 1, when the coupler of the charging station is attached to the vehicle, transformer parts 1, 2 physically sandwich license plate 3 with charging station-side transformer part 1 physically lying against the outer (typically exposed) side of license plate 3 and vehicle-side transformer part 2 physically lying against the inner side of license plate 3. The thickness of license plate 3 is depicted in FIG. 1. As transformer parts 1, 2 are physically adjacent to one another, albeit separated by the license plate thickness, transformer parts 1, 2 are inductively coupled together through license plate 3. Electrical energy can be transferred through transformer parts 1, 2 due to the inductive coupling of transformer parts 1, 2.

As shown in FIG. 1, charging station-side transformer part 1 is an E-shaped yoke. Similarly, vehicle-side transformer part 2 is a corresponding E-shaped yoke. Each transformer part 1, 2 is generally a yoke having at least one winding. The windings, nor associated electrical devices that are connected to the windings, are shown in FIG. 1. Such details regarding the windings and transformer parts 1, 2 in general are described, for example, in DE 24 34 890 B 1, which is hereby incorporated by reference in its entirety.

When transformer parts 1, 2 lie against opposite sides of license plate 3 as shown in FIG. 1, end sections (e.g., first transformer core leg portion 6a and second transformer core leg portion 6b) of the yokes of transformer parts 1, 2 lie opposite one another against the opposite sides of license plate 3. As a result, the end sections of the yokes of transformer parts 1, 2 are separated from each other only by license plate 3 and can thereby inductively couple together.

License plate 3 is formed of a material or combination of materials that conducts electrically no more than a relatively small extent. For example, license plate 3 is formed of an electrically non-conductive plastic material 5. As such, eddy current losses can be kept relatively small during energy transfer from charging station-side transformer part 1 to vehicle-side transformer part 2. The material forming license plate 3 includes magnetically conducting regions 4. Magnetically conducting regions 4 fill the thickness of license plate 3 at the locations between the opposing end sections of the yokes of transformer parts 1, 2 which meet adjacent to one another when the coupler is attached to the vehicle. That is, at these corresponding locations of license plate 3 through the entire thickness of license plate 3, license plate 3 is formed of a magnetic material in lieu of the plastic material. As such, the plastic of license plate 3 is filled with the magnetic material at these locations of license plate 3 which are physically adjacent to the corresponding end sections of the yokes of transformer parts 1, 2 when the coupler is attached to the vehicle. The magnetic material may be a ferromagnetic material or the like.

The inductive coupling of transformer parts 1, 2 can be further improved with the use of magnetically conducting regions 4. Such a configuration can be fabricated in a two-component injection molding process. In this molding process, a first unfilled plastic material forms a frame having recesses. The recesses are then filled with a plastic material that is filled with a ferromagnetic material.

In order to charge the traction battery of an electric vehicle, the driver drives the vehicle to the charging station and manually makes the coupling with the coupler of the charging station at the outside of license plate 3 behind which vehicle-side transformer part 2 is located.

The charging station may be configured such that a fully automatic procedure is used to connect the coupler of the charging station to the vehicle without human intervention. In this configuration, the charging station may include a camera aided position measuring device which detects the exact position of license plate 3. The charging station may further include an arm mechanism or the like which moves the coupler precisely to the position of license plate 3 as detected by the position measuring device.

As described, the coupler of the charging station includes charging station-side transformer part 1. An electric vehicle to be charged at the charging station includes a vehicle-side transformer part 2. The configurations of transformer parts 1, 2 correspond to one another as shown in FIG. 1. Vehicle-side transformer part 2 is located behind a license plate 3 of the vehicle. In particular, vehicle-side transformer part 2 is located physically against the inner side of license plate 3. The coupler can be attached to the vehicle when the vehicle is parked at the charging station. The coupler attaches to the vehicle by being placed on the outer side of license plate 3. When the coupler is attached to the vehicle, charging station-side transformer part 1 is located physically against the outer side of license plate 3 opposite to vehicle-side transformer part 2. In effect, transformer parts 1, 2, physically sandwich license plate 3. The end sections of the yokes of transformer parts 1, 2, are physically adjacent to one another and inductively couple together. Electrical energy can now be transferred from the charging station through the inductive path of transformer parts 1, 2 to the traction battery of the vehicle.

Charging station-side transformer part 1 transmits electrical energy for charging the traction battery on vehicle-side transformer part 2 until some predetermined event occurs. For example, energy is transferred from the charging station until a preselected amount of energy has been transferred to the vehicle or until a reduction in the charting current indicates that the traction battery is recharged sufficiently. The charging process terminates with the manual or automatic removal of the coupler of the charging station from the outer side of license plate 3.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for charging an electric vehicle, the system comprising:
   a vehicle-side transformer part arranged behind a license plate of the vehicle physically against an inner side of the license plate;
   wherein the vehicle-side transformer part couples with a charging station-side transformer part through the license plate when the charging station-side transformer part is arranged physically against an outer side of the license plate opposite to the vehicle-side transformer part with the transformer parts physically sandwiching the license plate such that electrical energy can be transferred through the transformer parts to the vehicle.

2. The system of claim 1 wherein:
   the vehicle-side transformer part includes a transformer core leg portion; and
   the transformer core leg portion of the vehicle-side transformer part is opposite to a transformer core leg portion of the charging station-side transformer part with the transformer core leg portions sandwiching a portion of the license plate whereby the transformer core leg portions and the portion of the license plate form a transformer core leg when the charging station-side transformer part is arranged physically against the outer side of the license plate opposite to the vehicle-side transformer part with the transformer parts sandwiching the license plate.

3. A system for charging an electric vehicle parked at a charging station, the system comprising:
   a charging station-side transformer part associated with a coupler of the charging station; and
   a vehicle-side transformer part associated with the vehicle and arranged behind a license plate of the vehicle physically against an inner side of the license plate;
   wherein the coupler is attachable to the vehicle to arrange the charging-side transformer part physically against an outer side of the license plate opposite to the vehicle-side transformer part with the transformer parts physically sandwiching the license plate and being coupled together through the license plate when the coupler is attached to the vehicle such that energy can be transferred from the charging station through the transformer parts to the vehicle.

4. The system of claim 3 wherein:
   the coupler is placed on the outer side of the license plate such that the charging-side transformer part is arranged physically against the outer side of the license plate.

5. The system of claim 3 wherein:
   the charging station-side transformer part includes a first transformer core leg portion;
   the vehicle-side transformer part includes a second transformer core leg portion;
   the transformer core leg portions are opposite to one another and sandwich a portion of the license plate whereby the transformer core leg portions and the portion of the license plate form a transformer core leg when the charging station-side transformer part is physically against the outer side of the license plate opposite to the vehicle-side transformer part with the transformer parts sandwiching the license plate.

6. A system for charging an electric vehicle, the system comprising:
   a license plate having a front surface and a rear surface;
   a charging station-side transformer part arranged physically against the front surface of the license plate; and
   a vehicle-side transformer part arranged physically against the rear surface of the license plate opposite to the charging station-side transformer part;
   wherein the transformer parts physically sandwich the license plate and are inductively coupled together through the license plate such that energy can be transferred through the transformer parts to the vehicle.

7. The system of claim 6 wherein:
   a majority portion of the license plate is a non-electrically conductive material.

8. The system of claim 7 wherein:
   the majority portion of the license plate is plastic.

9. The system of claim 7 wherein:
the license plate includes ferromagnetic material regions located in the license plate where the transformer parts are physically against the surfaces of the license plate opposite from one another.

10. The system of claim 6 wherein:
the license plate includes ferromagnetic material regions located in the license plate where the transformer parts are physically against the surfaces of the license plate opposite from one another.

11. The system of claim 6 further comprising:
a coupler connected to the charging station-side transformer part;
wherein the coupler is positioned near the front surface of the license plate such that the charging station-side transformer part is arranged physically against the front surface of the license plate.

12. The system of claim 11 wherein:
the coupler includes a bearing surface attachable to the front surface of the license plate, wherein dimensions of the bearing surface of the coupler correspond to dimensions of the front surface of the license plate.

13. The system of claim 6 wherein:
the charging station-side transformer part includes a first transformer core leg portion;
the vehicle-side transformer part incudes a second transformer core leg portion;
the transformer core leg portions are opposite to one another and sandwich a portion of the license plate whereby the transformer core leg portions and the portion of the license plate form a transformer core leg.

14. The system of claim 13 wherein:
the portion of the license plate that is part of the transformer core leg includes a magnetic material;
portions of the license plate adjacent to the portion of the license plate that is part of the transformer core leg include a non-magnetic material.

\* \* \* \* \*